United States Patent
Malik et al.

(10) Patent No.: US 12,344,257 B2
(45) Date of Patent: Jul. 1, 2025

(54) METHODS AND SYSTEMS FOR ADJUSTING VEHICLE BEHAVIOR BASED ON ESTIMATED UNINTENTIONAL LATERAL MOVEMENTS

(71) Applicant: Waymo LLC, Mountain View, CA (US)

(72) Inventors: Jasman Singh Malik, Mountain View, CA (US); Joe Riggs, Oakland, CA (US)

(73) Assignee: Waymo LLC, Mountain View, CA (US)

( * ) Notice: Subject to any disclaimer, the term of this patent is extended or adjusted under 35 U.S.C. 154(b) by 341 days.

(21) Appl. No.: 18/045,286

(22) Filed: Oct. 10, 2022

(65) Prior Publication Data

US 2024/0116516 A1     Apr. 11, 2024

(51) Int. Cl.
*B60W 40/105*     (2012.01)
*B60W 40/109*     (2012.01)

(52) U.S. Cl.
CPC ........ *B60W 40/105* (2013.01); *B60W 40/109* (2013.01); *B60W 2300/14* (2013.01);
(Continued)

(58) Field of Classification Search
CPC ............. B60W 40/105; B60W 40/109; B60W 2554/4041; B60W 2552/53; B60W 2555/20
See application file for complete search history.

(56) References Cited

U.S. PATENT DOCUMENTS 9,090,259 B2     7/2015   Dolgov
11,008,006 B2    5/2021   Natsumi
(Continued)

FOREIGN PATENT DOCUMENTS

DE    102011088164 A    6/2013
DE    102017005320 A1   2/2018
(Continued)

OTHER PUBLICATIONS

Chen, A Design of Cooperative overtaking based on complex lane detection and collision risk estimation (2019) (Year: 2019).*

(Continued)

*Primary Examiner* — Peter D Nolan
*Assistant Examiner* — Mikko Okechukwu Obioha
(74) *Attorney, Agent, or Firm* — McDonnell Boehnen Hulbert & Berghoff LLP

(57) ABSTRACT

Example embodiments relate to techniques for adjusting vehicle behavior based on estimated unintentional lateral movements. A computing system may receive sensor data representing a truck's environment as the truck pulls a trailer and navigates above a threshold speed on a freeway or another type of road. The computing system may use the sensor data to detect another truck navigating in an adjacent lane and at a speed that indicates an increased likelihood of a pass maneuver occurring between the trucks. Responsive to determining the increased likelihood of the pass maneuver occurring between the vehicles, the computing system may estimate an unintentional lateral movement for the pass maneuver based on parameters that can include the truck's speed, the size of the other truck's trailer, and a wind condition of the environment. The computing system can subsequently control the truck based on estimated unintentional lateral movement for the pass maneuver.

20 Claims, 12 Drawing Sheets

(52) U.S. Cl.
CPC . *B60W 2552/53* (2020.02); *B60W 2554/4041* (2020.02); *B60W 2554/4045* (2020.02); *B60W 2554/4049* (2020.02); *B60W 2555/20* (2020.02)

(56) References Cited

U.S. PATENT DOCUMENTS

| | | | |
|---|---|---|---|
| 11,186,223 B2 | 11/2021 | Kang | |
| 11,718,318 B2* | 8/2023 | Liu | G06V 20/58 701/23 |
| 2008/0201050 A1 | 8/2008 | Placke | |
| 2020/0324763 A1* | 10/2020 | Switkes | G08G 1/161 |
| 2021/0300371 A1* | 9/2021 | Sindhuja | B60W 60/001 |
| 2022/0348227 A1* | 11/2022 | Foster | G06V 20/588 |
| 2022/0379924 A1* | 12/2022 | Foster | B60W 30/18154 |
| 2022/0388502 A1* | 12/2022 | Lee | B60W 30/09 |
| 2023/0256901 A1* | 8/2023 | Horvath | G06V 20/58 340/426.1 |
| 2023/0399023 A1* | 12/2023 | Li | B60W 30/18163 |
| 2024/0067217 A1* | 2/2024 | Ayoubi | B60W 30/095 |

FOREIGN PATENT DOCUMENTS

| | | |
|---|---|---|
| JP | 6882957 B2 | 6/2021 |
| KR | 102281651 B1 | 7/2021 |
| WO | 2021041848 A1 | 3/2021 |
| WO | 2021176383 A1 | 9/2021 |

OTHER PUBLICATIONS

"Mercedes-Benz Crosswind Assist Stabilization Explained", https://www.autoevolution.com/news/mercedes-benz-crosswinds-assist-stabilization-explained-video-82940.html, retrieved May 19, 2022.

* cited by examiner

METHODS AND SYSTEMS FOR ADJUSTING VEHICLE BEHAVIOR BASED ON ESTIMATED UNINTENTIONAL LATERAL MOVEMENTS

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving.

SUMMARY

Example embodiments relate to techniques for adjusting vehicle behavior based on estimated unintentional lateral movements. An autonomous truck or another type of vehicle may use sensor data to anticipate and prepare for unintentional lateral movements that can occur during pass maneuvers with other vehicles. The autonomous truck may estimate an expected unintentional lateral movement based on one or multiple parameters specific to an upcoming pass maneuver, such as the type and behavior of the other vehicle, traffic flow, and environmental factors (e.g., wind and road conditions). In some instances, the autonomous truck may also factor the behavior of other vehicles performing passing maneuvers nearby when estimating the unintentional lateral movement that the autonomous truck may experience during an upcoming pass maneuver.

Accordingly, a first example embodiment describes a method. The method involves receiving, at a computing device coupled to a first truck pulling a first trailer, sensor data representing an environment of the first truck. The first truck is navigating at a first speed in a first lane of a road, and the first speed is above a threshold speed. The method also involves, based on the sensor data, detecting a second truck pulling a second trailer and navigating at a second speed in a second lane of the road. The second lane is adjacent to the first lane. The method also involves determining an increased likelihood of a pass maneuver occurring between the first truck and the second truck based on a difference between the first speed of the first truck and the second speed of the second truck, and responsive to determining the increased likelihood of the pass maneuver occurring between the first truck and the second truck, estimating an unintentional lateral movement for the pass maneuver based on a plurality of parameters. The plurality of parameters includes the first speed of the first truck, a size of the second trailer being pulled by the second truck, and a wind condition of the environment. The method also involves controlling the first truck based on the unintentional lateral movement estimated for the pass maneuver.

Another example embodiment describes a system. The system includes a first truck pulling a first trailer and a computing device coupled to the first truck. The computing device is configured to receive sensor data representing an environment of the first truck. The first truck is navigating at a first speed in a first lane of a road, and the first speed is above a threshold speed. Based on the sensor data, the computing device is configured to detect a second truck pulling a second trailer and navigating at a second speed in a second lane of the road, where the second lane is adjacent to the first lane. The computing device is further configured to determine an increased likelihood of a pass maneuver occurring between the first truck and the second truck based on a difference between the first speed of the first truck and the second speed of the second truck. The computing device is also configured to, responsive to determining the increased likelihood of the pass maneuver occurring between the first truck and the second truck, estimate an unintentional lateral movement for the pass maneuver based on a plurality of parameters. The plurality of parameters includes the first speed of the first truck, a size of the second trailer being pulled by the second truck, and a wind condition of the environment. The computing device is further configured to control the first truck based on the unintentional lateral movement estimated for the pass maneuver.

An additional example embodiment describes a non-transitory computer-readable medium configured to store instructions, that when executed by a computing device, causes the computing device to perform operations. The operations involve receiving sensor data representing an environment of a first truck pulling a first trailer. The first truck is navigating at a first speed in a first lane of a road, and the first speed is above a threshold speed. The operations also involve, based on the sensor data, detecting a second truck pulling a second trailer and navigating at a second speed in a second lane of the road. The second lane is adjacent to the first lane. The operations also involve determining an increased likelihood of a pass maneuver occurring between the first truck and the second truck based on a difference between the first speed of the first truck and the second speed of the second truck, and responsive to determining the increased likelihood of the pass maneuver occurring between the first truck and the second truck, estimating an unintentional lateral movement for the pass maneuver based on a plurality of parameters. The plurality of parameters includes the first speed of the first truck, a size of the second trailer being pulled by the second truck, and a wind condition of the environment. The operations also involve controlling the first truck based on the unintentional lateral movement estimated for the pass maneuver.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
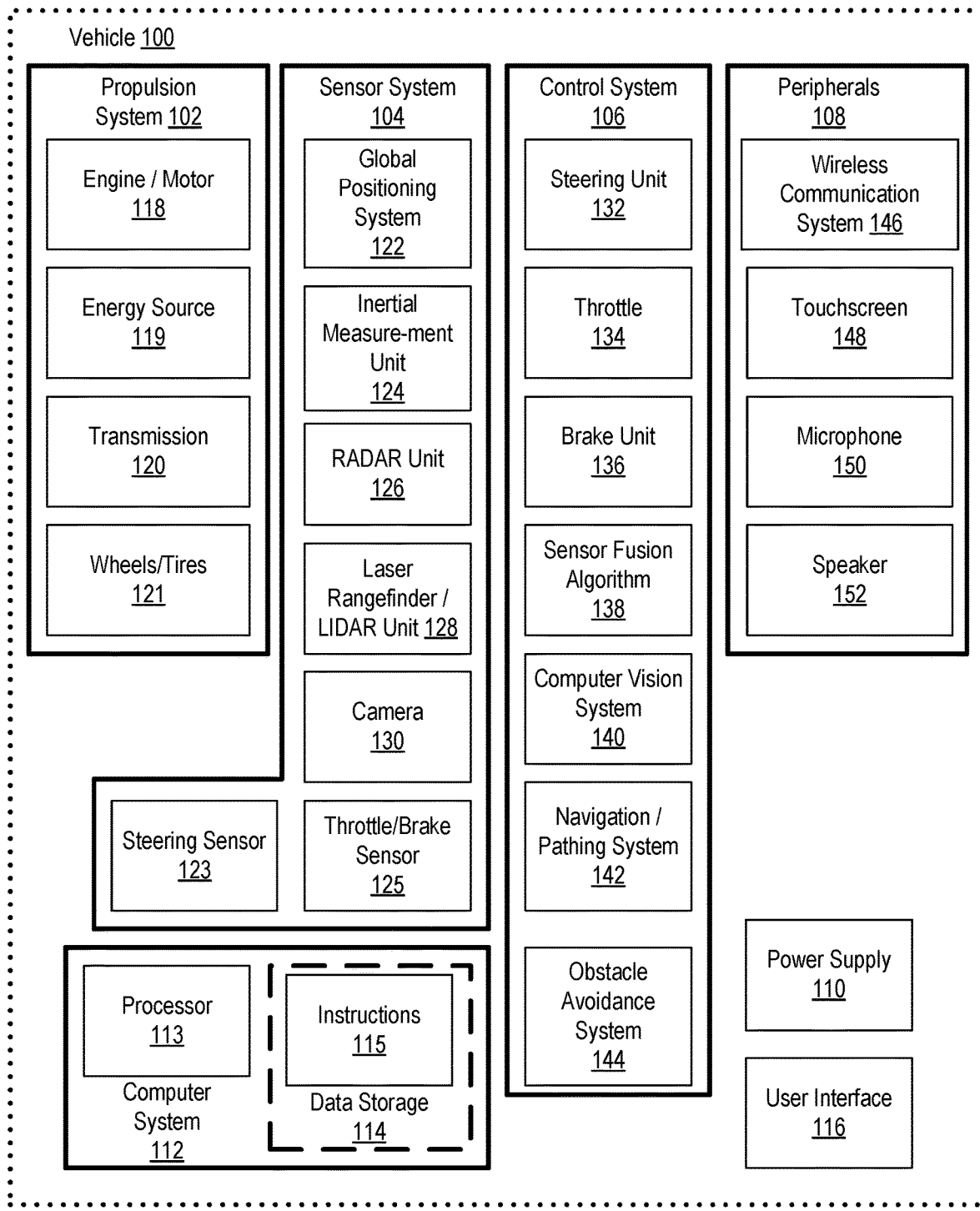
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Unintentional lateral movements are often experienced by semi-trucks and other large vehicles during pass maneuvers. In particular, as one vehicle passes another vehicle when traveling in the same direction on a road, one or both vehicles may experience an undesired lateral drift toward the other vehicle. Due to their large size and configuration, semi-trucks pulling trailers often experience unintentional lateral pull toward each other as the faster semi-truck passes the slower moving truck. The force that causes these vehicles to drift inward toward each other during pass maneuvers can occur due to various factors, such as cross winds pushing against the longitudinal cross sectional areas of each vehicle as well as changes in air pressure between the vehicles. The resulting drift experienced by vehicles during pass maneuvers can even be amplified to a greater extent in certain conditions, such as when the vehicle is a pulling trailer with a large cross-sectional area and in environments with high cross winds, and/or wet road conditions.

Drivers are often able to feel the drift during driving and perform actions that reduce the overall lateral movement of the vehicle. In some cases, however, a vehicle's driver may be unable to control this drift due to the condition of the vehicle (e.g., worn out tires) or due to an overall lack of skills handling the vehicle in such conditions. As such, the likelihood of unintentional contact between the vehicles increases during the passing maneuver, which can end up negatively impacting navigation in some cases.

Example embodiments described herein relate to techniques for adjusting vehicle behavior based on estimated unintentional lateral movements. An autonomous truck or another type of vehicle may perform disclosed techniques to anticipate and reduce the likelihood of undesirable drift and potential contact that can arise during a pass maneuver with another vehicle. Such techniques can enable vehicle systems (e.g., an onboard computing device) to prepare a control strategy according to specific parameters associated with an identified upcoming pass maneuver and subsequently use the strategy to navigate in a way that safely maintains a gap between the vehicles throughout the entirety of the pass maneuver. In some cases, vehicle systems may determine that the estimated drift for an upcoming lane change exceeds a threshold value and control the vehicle in a way that avoids the drift, such as by decreasing vehicle speed, repositioning the vehicle within the lane, and/or causing the vehicle to change lanes to further distance itself from the other vehicle. As such, autonomous trucks, buses, and other types of vehicles may use disclosed techniques to enable safe autonomous or semi-autonomous navigation in various conditions, including during navigation in high winds and/or wet environments that may further contribute to the potential unintentional lateral drift experienced during pass maneuvers.

By way of an example, an onboard computing device may use sensor data that represents a truck's surrounding environment in real-time to determine that the likelihood of a pass maneuver involving the truck and another nearby vehicle is increasing. In particular, as the likelihood of the pass maneuver with another vehicle continues to approach a threshold level, the computing device may use the sensor data in-real time to identify parameters associated with the likely upcoming pass maneuver. For instance, sensor data can be used to determine parameters about the other vehicle that is likely going to participate in the upcoming pass maneuver, such as a position, a speed, recent behavior, a type, and size parameters for the other vehicle. The other vehicle's position and speed can be used to determine if it is traveling faster than the vehicle and approaching to pass the vehicle or if the other vehicle is traveling slower than the vehicle and will be passed by the vehicle. The recent behavior of the other vehicle can indicate if the vehicle appears to be traveling relatively straight within its lane or if the other vehicle is swaying within its lane due to high winds and/or for other reasons (e.g., distracted driver). The type and size parameters may convey physical configuration information about the other vehicle. For instance, the drift can be greater when the other vehicle is a larger vehicle (e.g., a semi-truck pulling a trailer) than when the other vehicle is a passenger vehicle. Other information can be obtained about the other vehicle(s) that are likely to participate in a pass maneuver with the vehicle and subsequently used to estimate the potential drift in real-time enabling vehicle behavior to be adjusted accordingly.

Sensor data can also be used to gather information about the environment, such as road grade, road boundary information, traffic conditions, weather conditions, and/or wind conditions, etc. For instance, road grade and road boundary information can be compared to other scenarios to determine if these elements may influence the expected drift. As an example, roadways with high walls along the road (e.g., a highway) can impact the air speed experienced by vehicles from cross winds. Similarly, curves, inclines/declines, bumps, and the material of the road may influence how much friction occurs during travel and where and how much drift might occur at different points of the pass maneuver. Environment parameters can be used by vehicle systems to anticipate potential drifts during passing maneuvers and other navigation techniques. In some examples, computing systems may not factor environment parameters when estimating potential drift for an upcoming pass maneuver with another vehicle.

In some examples, traffic conditions can be used by the computing system when performing disclosed techniques. For instance, the computing device can determine the positions, speeds, orientations, past actions, and predicted behaviors for nearby vehicles to determine alternative strategies (e.g., lane change) if a potential drift estimated for an upcoming pass maneuver may result in navigation dropping below a safety threshold. Similarly, the computing device can use the information about other vehicles to anticipate a buffer, such as moving over toward a side of the lane away further from another vehicle about to engage in a pass maneuver with the vehicle.

Weather conditions can be used to further estimate the potential drift during a pass maneuver. For instance, wet or snowy roads may have less friction that results in the potential drift being greater than a dry road. Weather conditions can be determined via communication with external computing devices (e.g., a weather database or other vehicles) and/or using onboard sensors. Similarly, high cross winds may further emphasize the drift during the pass maneuver, which can cause one of the vehicles (or both vehicles) to further drift during the performance of the pass maneuver. As such, computing systems may measure and/or obtain wind data to factor the impact of the wind during potential pass maneuvers. A vehicle may include one or more types of wind-measuring sensors that can capture data that indicates a direction and a speed of wind experienced by the vehicle. Weather conditions can be used in other ways during performance of disclosed techniques.

The computing device may use one or multiple parameters to predict the potential drift the truck may experience during an upcoming pass maneuver with another vehicle. In some embodiments, the computing device may estimate the drift that the truck will experience as well as an expected drift that the other vehicle may experience during the pass maneuver, which can change based on behavior of the truck as the chances of the pass maneuver increases. In some examples, the computing device may use parameters to simulate an upcoming pass maneuver in order to determine a control strategy for the truck. For instance, the computing device may perform the simulations using a variety of information about the other vehicle (e.g., behavior, speed, type), traffic, weather conditions (e.g., wind speed and direction), and/or road conditions. In other examples, the computing device may use one or multiple models developed based on similar scenarios to estimate potential drift during a pass maneuver. For instance, vehicle systems may use a machine-learned model (or multiple models) to develop control instructions for an upcoming pass maneuver. The machine-learned model(s) can provide an output based on inputs representative of the upcoming pass maneuver, such as the type, speed, behavior, and/or size of vehicle and other potential parameters (e.g., wind speed and direction).

In some examples, the computing device may determine and factor additional information when predicting the potential unintentional lateral movement that a vehicle may experience during a pass maneuver. For instance, the computing device may estimate and use the speed differential between the truck's speed and the speed of the other vehicle participating in the pass maneuver. The computing device may also factor the position of one or both vehicles within each lane, respectively. For instance, the amount of drift may be greater in cases when the other vehicle is positioned closer to the border that both lanes share. In such cases, the likelihood of unintended contact between the vehicles may increase as an example result. In some cases, the parameters used to predict an upcoming drift associated with a pass maneuver can depend on simulations that indicate which combination of parameters provides an accurate prediction of the upcoming drift.

Vehicle systems can adjust behavior of a vehicle based on estimated lateral movements predicted for a pass maneuver. For instance, vehicle systems can adjust a position of the vehicle within its lane, which can reduce the potential drift and also minimize the chance of a collision with the other vehicle involved in the pass maneuver. Similarly, vehicle systems can also temporarily steer to ensure that the vehicle counters the drift as the pass maneuver is performed. In some cases, vehicle systems may also change vehicle speed and/or perform a lane change.

In some examples, disclosed techniques are performed by a truck or another type of vehicle that is about to pass another vehicle or multiple vehicles. For instance, vehicle systems may determine that a slow lead vehicle could be passed and perform one or more disclosed techniques to estimate the drift prior to passing the slow lead vehicle. In other examples, disclosed techniques are performed by a truck or another type of vehicle that is about to be passed by another vehicle or multiple vehicles. For instance, rear-facing sensors can capture sensor data that indicates that another vehicle is approaching at a faster speed than the vehicle is currently traveling. Due to this speed differential, vehicle systems may prepare for and estimate the potential drift that can arise when the faster traveling vehicle performs the pass maneuver.

In some example embodiments, a vehicle performing disclosed techniques may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/lidar unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152.

Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3 G cellular communication, such as CDMA, EVDO, GSM/GPRS, or 4 G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
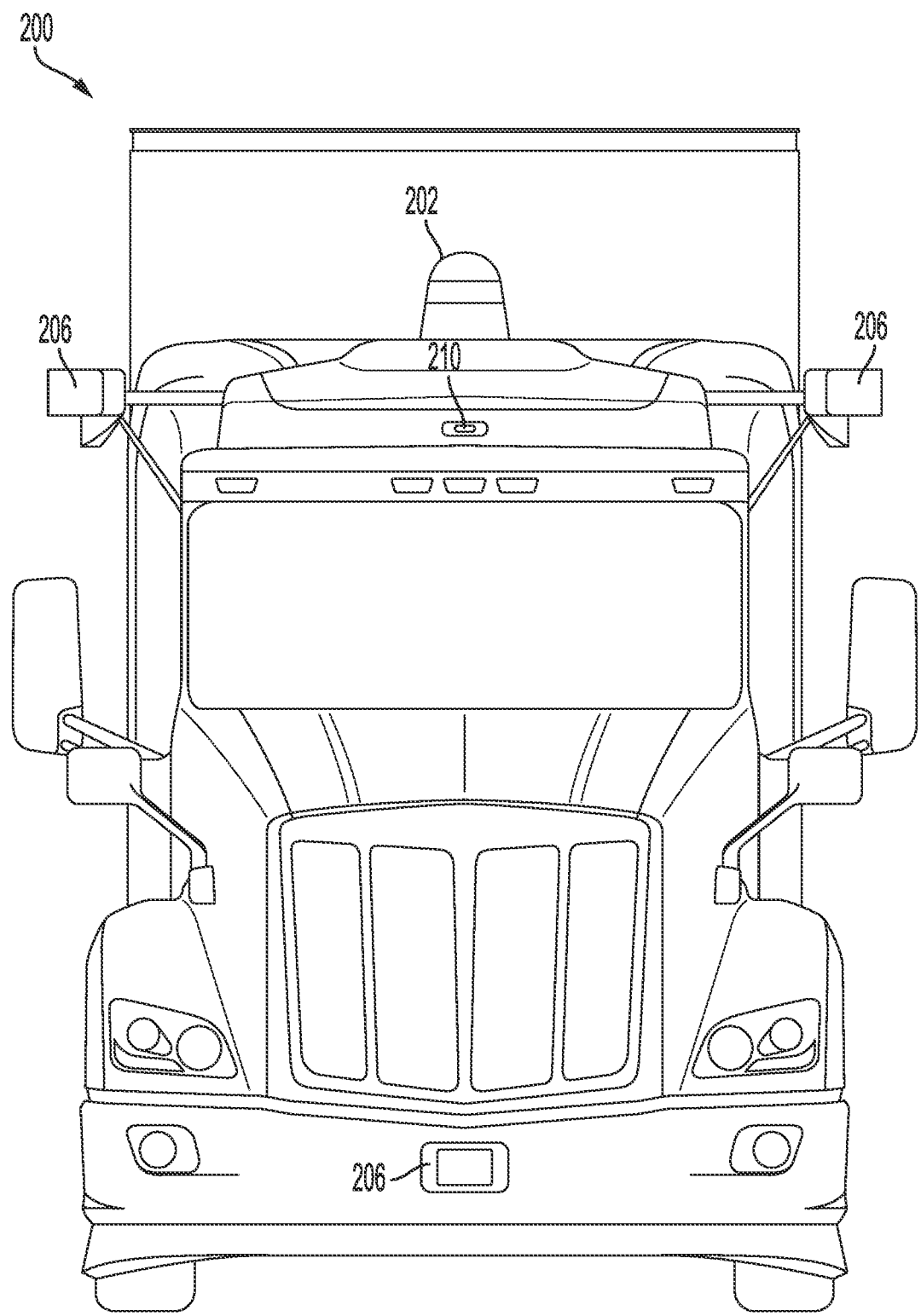
FIG. 2A illustrates a front view of a vehicle, according to one or more example embodiments.
Figure 2B:
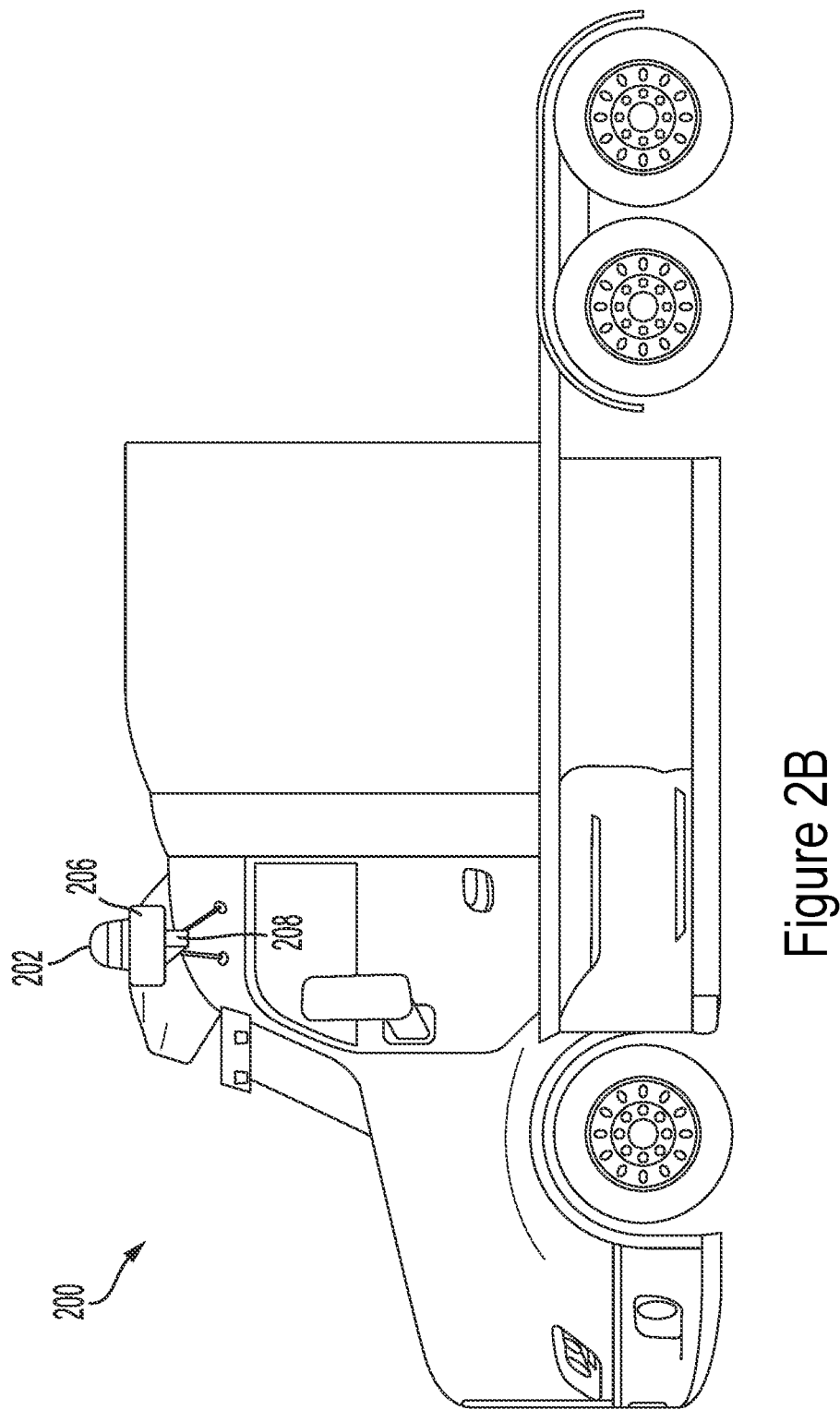
FIG. 2B illustrates a side view of a vehicle, according to one or more example embodiments.
Figure 2C:
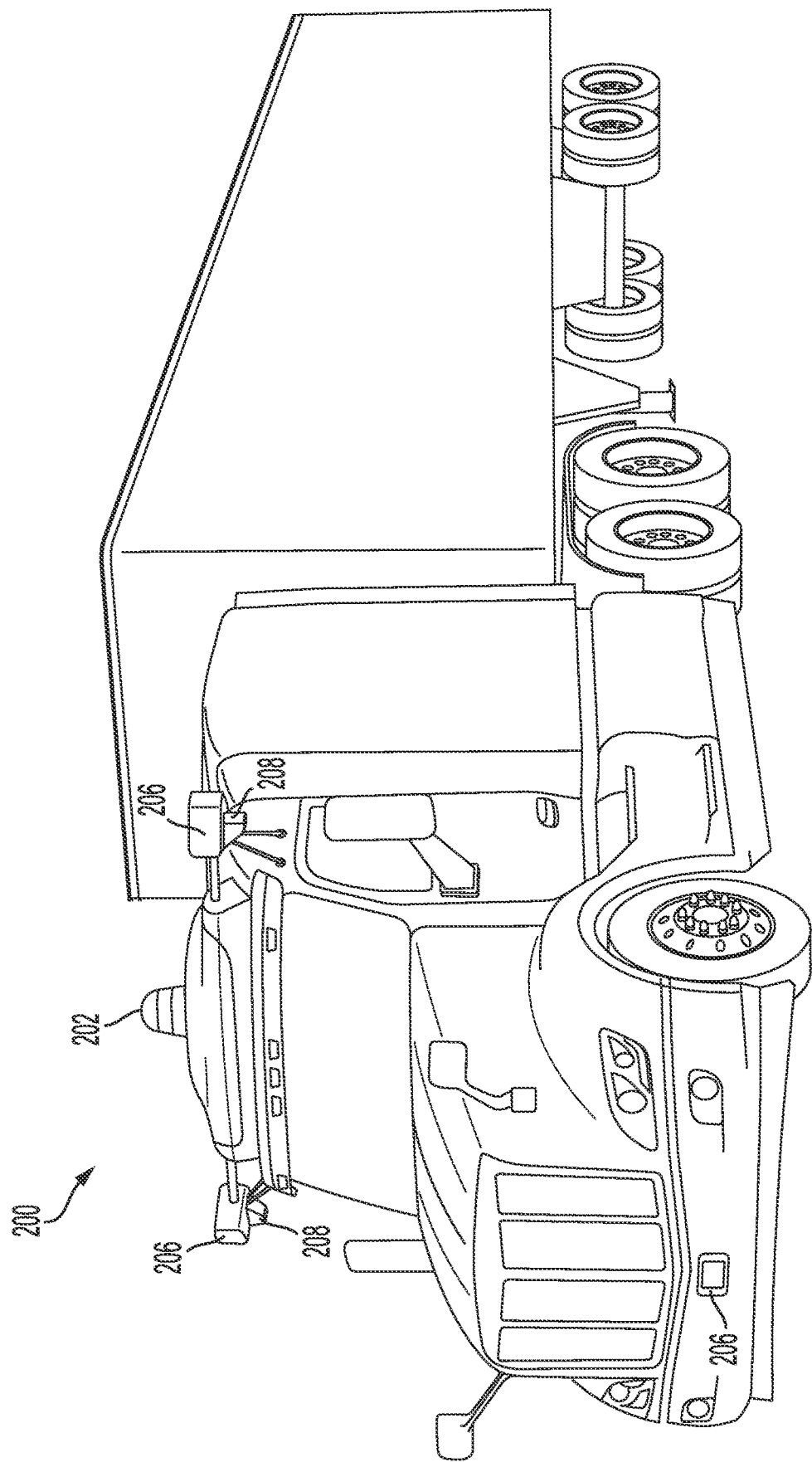
FIG. 2C illustrates a perspective view of a vehicle, according to one or more example embodiments.
Figure 2D:
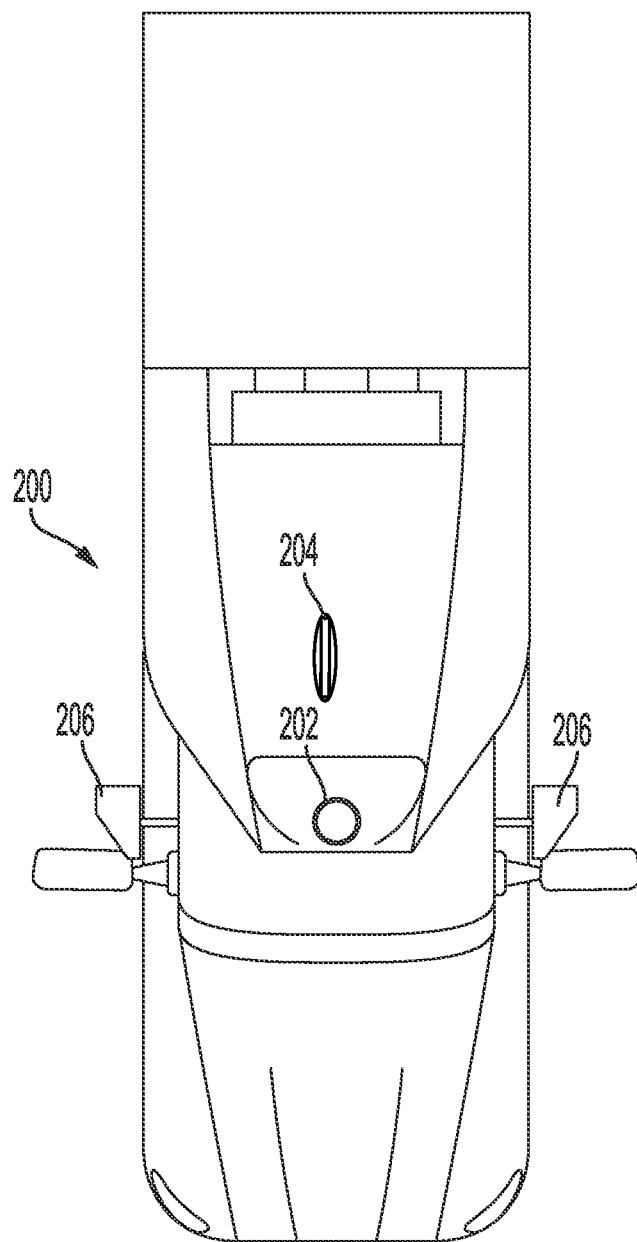
FIG. 2D illustrates a top view of a vehicle, according to one or more example embodiments.

FIG. 2A illustrates a front view of vehicle 200, FIG. 2B illustrates a side view of vehicle 200, FIG. 2C illustrates a perspective view of vehicle 200, and FIG. 2D illustrates a top view of vehicle 200. As such, FIGS. 2A-2D together illustrate an example physical configuration of vehicle 200, which may represent one possible physical configuration of vehicle 100 described in reference to FIG. 1. Depending on the embodiment, vehicle 200 may include sensor unit 202, wireless communication system 204, radar unit 206, lidar units 208, and camera 210, among other possible components. For instance, vehicle 200 may include some or all of the elements of components described in FIG. 1. Although vehicle 200 is depicted in FIG. 2 as a semi-truck, vehicle 200 can have other configurations within examples, such as a car, a van, a motorcycle, a bus, a shuttle, a golf cart, an off-road vehicle, robotic device, a farm vehicle, or other vehicles pulling a trailer among other possible examples.

Sensor unit 202 may include one or more sensors configured to capture information of the surrounding environment of vehicle 200. For example, sensor unit 202 may include any combination of cameras, radars, lidars, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a truck. Additionally, other mounting locations are possible within examples.

Wireless communication system 204 may have a location relative to vehicle 200 as depicted in FIG. 2D, but can also have different locations. Wireless communication system 204 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems. Communication system 204 may include a cellular or wireless data connection. The communication system 204 may be configured to communicate with a remote computing system. The remote computing system may be configured to provide instructions and/or data to the vehicle 200 to aid in its autonomous operation.

The vehicle 200 may include several radar units 206 at various locations. In one example, the vehicle 200 may include a radar unit located on each of the front and back bumpers of the cab portion. Additionally, the vehicle 200 may include two radar units located on each side of the vehicle 200 near the side-view mirrors. The two radar units on the sides of the vehicle may be positioned so that one images a forward right section, one images a forward left section, one images a rear right section, and one images a rear left section. Each radar unit may be configured to transmit and receive radar signals over an angular region defined by a beamwidth of the radar unit. In some examples, each radar unit may be able to perform beam steering on transmit or receive beams. By using beam steering, a radar unit may be able to interrogate a predefined angular direction.

The vehicle 200 may also include lidar units 208 mounted in various locations. For example, lidar units 208 may also be mounted on the sides of the vehicle 200 near the rear-view mirrors. Lidar units 208 may be configured to transmit and receive light signals from the region around the vehicle. Lidar units 208 may be able to image the region around the vehicle 200 from which light reflections are received.

Camera 210 may have various positions relative to the vehicle 200, such as a location above a front windshield of vehicle 200. As such, camera 210 may capture images of the environment. For instance, camera 210 may capture images from a forward-looking view with respect to vehicle 200, but other mounting locations (including movable mounts) and viewing angles of camera 210 are possible within implementations. In some examples, camera 210 may correspond to one or more visible light cameras, but can also be other types of cameras (e.g., infrared sensor). Camera 210 may also include optics that may provide an adjustable field of view.

Figure 3:
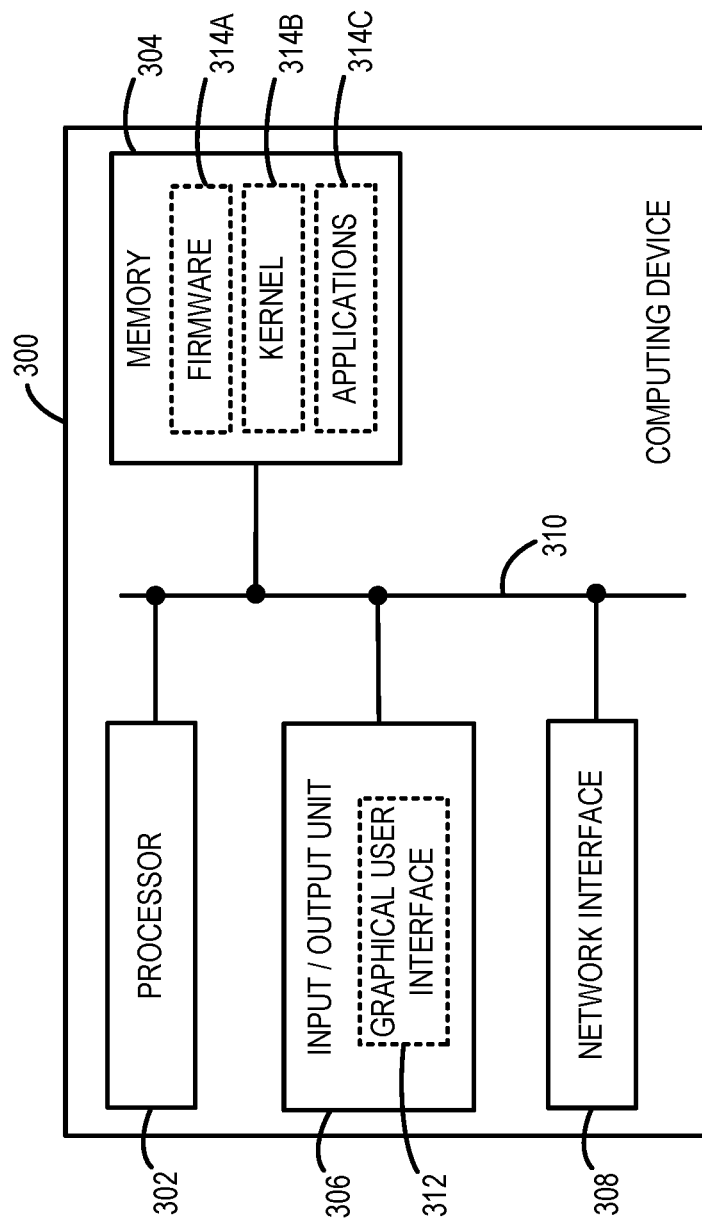
FIG. 3 is a functional block diagram illustrating a computing device, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Computing device 300 may perform route optimization techniques described herein. In some cases, computing device 300 may determine route and/or control instructions for a vehicle. In some embodiments, computing device 300 may be onboard a vehicle. In such cases, computing device 300 may analyze sensor data in real-time to optimize maneuverability of the vehicle during navigation. In other embodiments, computing device 300 may be positioned remotely from the vehicle. In such cases, computing device 300 may be an individual computing device or it may be a fleet manager device receiving sensor data from more than one vehicle. Further, analyzing sensor data in such cases may involve running one or more simulations based on the sensor data to determine the level of feasibility of a maneuver for a particular vehicle.

Figure 4:
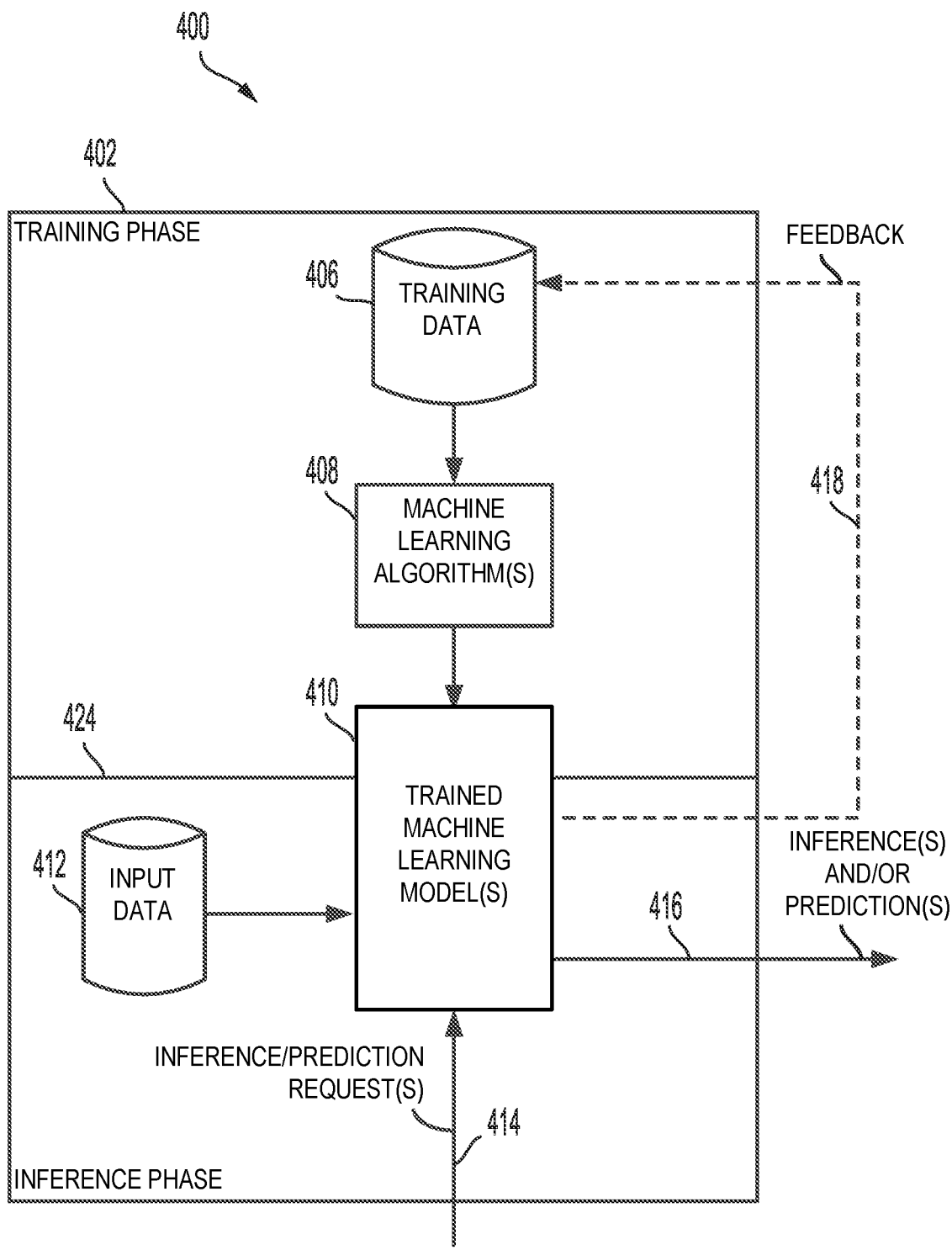
FIG. 4 is a functional block diagram illustrating a training phase and an inference phase for generating a trained machine learning model, according to one or more example embodiments.

FIG. 4 shows diagram 400 illustrating training phase 402 and inference phase 404 of trained machine learning model(s) 410. Trained machine learning models 410 can be generated and used for performing disclosed techniques. For instance, a vehicle can use nearby traffic and environment parameters as inputs into a module that uses one or multiple trained machine learning models to estimate unintentional lateral drift in a pass maneuver scenario. The process can be iteratively performed to develop accurate estimations for drifts for vehicles operating at different speeds and conditions.

Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 that involves one or more machine learning algorithms 408 being trained on training data 406 to generate trained machine learning model(s) 410. Then, during inference phase 404, trained machine learning model(s) 410 can receive input data 412 and one or more inference/prediction requests 414 and responsively provide as an output one or more inferences and/or predictions 416.

Trained machine learning model(s) 410 can include one or more models of one or more machine learning algorithms 408. Machine learning algorithm(s) 408 may include, but are not limited to: an artificial neural network (e.g., a convolutional neural network, a recurrent neural network), a Bayesian network, a hidden Markov model, a Markov decision process, a logistic regression function, a support vector machine, a suitable statistical machine learning algorithm, and/or a heuristic machine learning system. Machine learning algorithm(s) 408 may be supervised or unsupervised, and may implement any suitable combination of online and offline learning. In some examples, machine learning algorithm(s) 408 and/or trained machine learning model(s) 410 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 408 and/or trained machine learning model(s) 410. In some examples, trained machine learning model(s) 410 can be trained, reside on and executed to provide inferences on a particular computing device, and/or otherwise can make inferences for the particular computing device.

During training phase 402, machine learning algorithm(s) 408 can be trained by providing at least training data 406 as training input using unsupervised, semi-supervised, supervised, and/or reinforcement learning techniques. Unsupervised learning involves providing a portion (or all) of training data 406 to machine learning algorithm(s) 408 and machine learning algorithm(s) 408 determining one or more output inferences based on the provided portion (or all) of training data 406. In some embodiments, training of the machine learning model may involve unsupervised learning based on a loss function that measures travel time, or a disengage probability, or both. Semi-supervised learning involves having correct results for part, but not all, of training data 406. During semi-supervised learning, supervised learning is used for a portion of training data 406 having correct results, and unsupervised learning is used for a portion of training data 406 not having correct results.

Supervised learning involves providing a portion of training data 406 to machine learning algorithm(s) 408, with machine learning algorithm(s) 408 determining one or more output inferences based on the provided portion of training data 406, and the output inference(s) are either accepted or corrected based on correct results associated with training data 406. In some examples, supervised learning of machine learning algorithm(s) 408 can be governed by a set of rules and/or a set of labels for the training input, and the set of rules and/or set of labels may be used to correct inferences of machine learning algorithm(s) 408.

In some instances, models developed through supervised learning can be used to help an autonomous vehicle make decisions in situations where it may need to perform a pass maneuver with another vehicle. For example, logged data from executed manual driving strategies, autonomous driving strategies, or both, on highway navigation and other roadways with pass maneuver situations may be utilized for supervised training of machine learning algorithm(s) 408. Data labelers may observe the scene, nearby traffic, and a pose of the autonomous vehicle. Data labelers may then label the situation as either "yes" to indicate a threshold amount of drift occurred during a pass maneuver, or as "no" to indicate the threshold amount of drift did not occur during the pass maneuver. The labeled scenes can then be used as training data 406 to train machine learning algorithm(s) 408 that would help the autonomous truck make decisions in novel driving scenarios.

Supervised learning methods may be similarly applied to simulated data to significantly augment the training data 406. Artificial freeway pass maneuver scenarios may be generated with various geometries, random traffic placements, random agent velocities, and random agent accelerations. For example, with simulated vehicles performing a pass maneuver, the data labeler can label the scenario as either "yes" to a threshold amount of drift occurring during the pass maneuver for the simulated vehicles, or as "no" to indicate the simulated vehicles did not drift the threshold amount during the pass maneuver. The labeled artificial scenes can be used as training data 406 to train machine learning algorithm(s) 408.

Reinforcement learning involves machine learning algorithm(s) 408 receiving a reward signal regarding a prior inference, where the reward signal can be a numerical value. During reinforcement learning, machine learning algorithm(s) 408 can output an inference and receive a reward signal in response, where machine learning algorithm(s) 408 are configured to try to maximize the numerical value of the reward signal. In some examples, reinforcement learning also utilizes a value function that provides a numerical value representing an expected total of the numerical values provided by the reward signal over time. For example, when a discrete decision is to be selected from two or more options or plans, such as, for example, continue to drive in a first lane or change lanes to a second lane, a policy may be constructed that scores each planned trajectory against a rubric of features.

For example, scored features of a trajectory may include (but may not be limited to) a progress made with each trajectory, a difficulty of performing a lane change operation, an amount of acceleration needed by either the autonomous truck or other agents and/or vehicles in the scene in order to smoothly negotiate slow lead agent scenarios, a kinematic comfort of each trajectory, or a minimum predicted buffer provided to other agents and/or vehicles at the scene. The total score for each possible trajectory may be a weighted sum of each scored feature, and the autonomous truck may follow a plan with a lowest score. The respective feature weights may be selected by a variety of automatic and/or heuristic methods. For example, feature weights may be learned from human driving behavior in situations with slow lead agents. Also, for example, for a set of trajectories driven by a human driver in such scenarios, a technique such as inverse reinforcement learning may be applied to compute the set of feature weights. Such an approach helps mimic a logic applied by a human driver.

In some examples, machine learning algorithm(s) 408 and/or trained machine learning model(s) 410 can be trained using other machine learning techniques, including but not limited to, incremental learning and curriculum learning.

In some examples, machine learning algorithm(s) 408 and/or trained machine learning model(s) 410 can use transfer learning techniques. For example, transfer learning techniques can involve trained machine learning model(s) 410 being pre-trained on one set of data and additionally trained using training data 406. More particularly, machine learning algorithm(s) 408 can be pre-trained on data from one or more computing devices and a resulting trained machine learning model provided to a particular computing device, where the particular computing device is intended to execute the trained machine learning model during inference phase 604. Then, during training phase 402, the pre-trained machine learning model can be additionally trained using training data 406, where training data 406 can be derived from kernel and non-kernel data of the particular computing device. This further training of the machine learning algorithm(s) 408 and/or the pre-trained machine learning model using training data 406 of the particular computing device's data can be performed using either supervised or unsupervised learning. Once machine learning algorithm(s) 408 and/or the pre-trained machine learning model has been trained on at least training data 406, training phase 402 can be completed. The trained resulting machine learning model can be utilized as at least one of trained machine learning model(s) 410.

In particular, once training phase 402 has been completed, trained machine learning model(s) 410 can be provided to a computing device, if not already on the computing device. Inference phase 404 can begin after trained machine learning model(s) 410 are provided to the particular computing device.

During inference phase 404, trained machine learning model(s) 410 can receive input data 412 and generate and output one or more corresponding inferences and/or predictions 416 about input data 412. As such, input data 412 can be used as an input to trained machine learning model(s) 410 for providing corresponding inference(s) and/or prediction(s) 416 to kernel components and non-kernel components. For example, trained machine learning model(s) 410 can generate inference(s) and/or prediction(s) 416 in response to one or more inference/prediction requests 416. In some examples, trained machine learning model(s) 410 can be executed by a portion of other software. For example, trained machine learning model(s) 410 can be executed by an inference or prediction daemon to be readily available to provide inferences and/or predictions upon request. Input data 412 can include data from the particular computing device executing trained machine learning model(s) 410 and/or input data from one or more computing devices other than the particular computing device.

Input data 412 can include one or more of real-world driving scenarios, simulated driving scenarios, or both. Artificial freeway slow lead agent scenarios may be generated with various geometries, random traffic placements, random agent velocities, and/or random agent accelerations. Other types of input data are possible as well. Input data 412 can be labeled images that indicate a preference for a lane change or not, or that select a driving strategy from one or more available strategies.

Inference(s) and/or prediction(s) 416 can include output navigation plans, output driving strategies, and/or other output data produced by trained machine learning model(s) 410 operating on input data 412 (and training data 406). In some embodiments, output inference(s) and/or prediction(s) 416 may include predicted navigation plans of other vehicles (such as a vehicle that has a high probability of an interaction with the autonomous truck, a merging vehicle, and so forth). In some examples, trained machine learning model(s) 410 can use output inference(s) and/or prediction(s) 416 as input feedback 418. Trained machine learning model(s) 410 can also rely on past inferences as inputs for generating new inferences.

Deep neural nets for determining lane change strategies can be examples of machine learning algorithm(s) 408. After training, the trained version of deep neural nets can be examples of trained machine learning model(s) 410. In this approach, an example of inference/prediction request(s) 416 can be a request to predict a driving strategy for an input scenario involving a slow lead agent and a corresponding example of inferences and/or prediction(s) 416 can be an output driving strategy.

For example, encoding a roadgraph may be of high significance for various tasks in perception and/or behavior predictions, such as lane change predictions. In some embodiments, a roadgraph may be leveraged in deep learning by rasterizing roadgraph features onto a two-dimensional (2D) top-down grid (i.e. rendered images), and then by applying a convolution neural network (CNN) on the rendered images. Such a rasterized approach may depend on various factors, such as, for example, a geometry range, a CNN receptive field (that may impose limits on a long-range understanding of geometry), and precision thresholds from the rendering. In some instances, the road graph and agent dynamics can be encoded without rendering.

In some embodiments, a hierarchical graph neural network may be used to encode the roadgraph and/or driving behavior dynamics, without rendering. The generated model may be trained in a supervised manner, as described above, or may be trained to minimize an appropriate loss function to determine lane change strategies.

In some aspects, the generated model may be a unified representation for multi-agent dynamics and structured scene context, and may be generated directly from respective vectorized representation. For example, a geographic extent of road features may be represented in geographic coordinates as a point, a polygon, and/or a curve. For example, a lane boundary may include a plurality of control points that can generate a spline. As another example, a crosswalk may be represented as a polygon defined by several points. Also, for example, a stop sign may be represented by a single point. Such entities may be approximated as geographic polylines defined by multiple control points, along with their respective attributes. Similarly, dynamics of moving agents (e.g., vehicles, pedestrians) may also be approximated by dynamic polylines based on their respective motion trajectories. The geographic and dynamic polylines may then be represented as collections of vectors.

In some embodiments, graph neural networks (GNNs) may be utilized to incorporate the collections of vectors. For example, a node in the GNN may represent a vector, and node features may be determined based on a start location and an end location of each vector, along with other attributes, such as a polyline group identifier, semantic labels, and so forth. Also, for example, context information from maps, along with the trajectories of other moving agents may be propagated to a target agent node through the GNN. Accordingly, an output node feature corresponding to the target agent may be utilized to decode future trajectories for the target agent.

One or more connectivities of the GNN may be constrained based on a spatial and/or semantic proximity of the nodes. Accordingly, a hierarchical graph architecture may be generated, where vectors belonging to the same polylines with the same semantic labels are connected and embedded into polyline features, and all polylines may then be fully connected with each other to exchange information. In some embodiments, local graphs may be implemented with multi-layer perceptrons, and the global graphs may be implemented with self-attention.

In some embodiments, the image rendering approach may be combined with the hierarchical graph neural network approach to train machine learning algorithm(s) 408.

In some examples, a first computing device can include the trained version of the machine learning model. Then, the first computing device can receive requests to predict lane change strategies, and use the trained version of the machine learning model to predict the lane change strategy. In some examples, two or more computing devices, such as a client device and a server device can be used to provide the output; e.g., the client device can generate and send requests to predict lane change strategies to the server device. Then, the server device can use the trained version of the machine learning model to predict the lane change strategies. Then, upon reception of responses to the requests, the client device can provide the requested output via one or more control interfaces.

Figure 5:
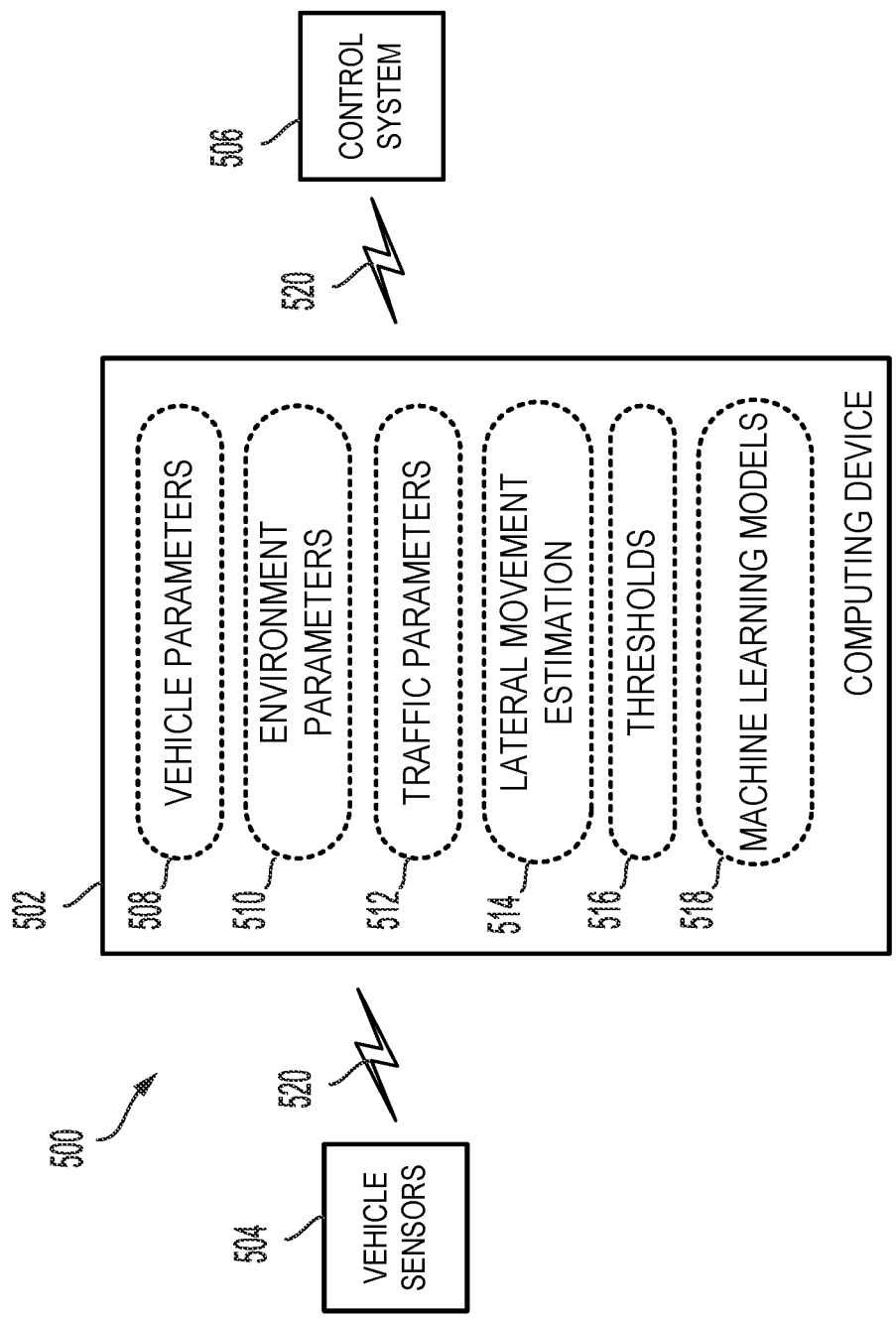
FIG. 5 is a block diagram of a system for adjusting vehicle behavior based on estimated unintentional lateral movements, according to one or more example embodiments.

FIG. 5 is a block diagram of system 500 for adjusting vehicle behavior based on estimated unintentional lateral movements. In the example embodiment, system 500 includes computing device 502 communicating with vehicle sensors 504 and control system 506 via wired or wireless communication 520. Computing device 502 can execute software to perform disclosed techniques in order to anticipate and factor unintentional lateral movements that can arise when being passed by other vehicles and/or when passing other vehicles during navigation. In other examples, system 500 can include more or fewer components in other arrangements.

Computing device 502 represents a vehicle computing system and may involve one or multiple processors configured to perform computational operations. For instance, computing device 502 can be implemented as computing system 112 in vehicle 100 shown in FIG. 1 or computing device 300 shown in FIG. 3. As such, computing device 502 can operate onboard any type of vehicle and perform operations using incoming data in real-time, such as sensor data from vehicle sensors 504 and control data from control system 506. In some embodiments, computing device 502 may also involve a remote computing system that is communicating wirelessly with onboard computing systems of a vehicle.

In the example embodiment shown in FIG. 5, computing device 502 may use sensor measurements of the surrounding environment that are obtained from vehicle sensors 504 to determine information associated with a potential pass maneuver with another vehicle. The information can then be used to formulate control strategy for execution by control system 506 and may include vehicle parameters 508, environment parameters 510, and traffic parameters 512 as shown in FIG. 5.

Vehicle parameters 508 can represent information about the vehicle associated with computing device 502 and/or other vehicles in the surrounding environment. For instance, vehicle parameters 508 can represent information about another vehicle that is about to be passed by the vehicle controlled by control system 506. The information can indicate a lane position, a heading, behavior (e.g., recent movements), speed, size, and/or mode of operation (e.g., autonomous or driver driven), among others. Vehicle parameters 508 can also specify information about a trailer being pulled by the other vehicle. For instance, vehicle parameters 508 can represent the size and height for the trailer being pulled by the other vehicle. Environment parameters 510 may represent wind and other weather conditions. Traffic parameters 512 can represent different information about surrounding traffic in the area of the vehicle. These parameter groupings can have overlap and are illustrated in FIG. 5 as examples.

In some cases, computing device 502 may use onboard sensors to determine one or more parameters in real-time. For instance, computing device 502 can use incoming images and/or other types of sensor data to determine vehicle parameters 508, environment parameters 510, and/or traffic parameters 512. Computing device 502 can also obtain parameters from other vehicle systems, other vehicles, and/or remote computing devices (e.g., databases). For instance, computing device 502 can receive information about one or more parameters from one or multiple sources. In some examples, computing device 502 may estimate parameters based on sensor measurements. For instance, computing device 502 may estimate a cross wind or general wind conditions based on measurements of infrastructure, foliage, and/or flags indicating information related to wind direction and wind strength.

Using one or more parameters obtained via sensor data, map data, and/or from another source, computing device 502 may determine lateral movement estimation 514 for one or multiple pass maneuvers that are likely to occur (e.g., in the next 30 seconds). Computing device 502 may compare lateral movement estimation 514 to one or more thresholds 516. For instance, thresholds 516 may specify a maximum drift and/or other ways of evaluating an anticipated unintentional movement that the vehicle may experience during an upcoming pass maneuver. When lateral movement estimation 514 meets or exceeds the maximum drift, there may be an increased likelihood of collision during the pass maneuver. As an example result, computing device 502 may determine a different control strategy that avoids performing the pass maneuver until sensor data indicates that conditions for the maneuver have improved.

In some examples, computing device 502 may determine a control strategy for an upcoming pass maneuver based on multiple thresholds 516. For instance, a first threshold can be used to determine whether or not the vehicle should perform the pass maneuver. Another threshold can be used to determine a speed or other controls for the vehicle to use. In some cases, a threshold can also be used to determine a position of the vehicle within its lane. These examples are not limiting and other cases may involve using thresholds to determine other navigation strategies given the specific features associated with the surrounding environment of the vehicle.

In addition, machine learning models 518 can be used in some examples. Machine learning models 518 can receive one or multiple parameters (e.g., vehicle parameters 508, environment parameters 510, and traffic parameters 512) as inputs in order to output a control strategy for control system 506 to perform. In some cases, machine learning models 518 may be trained on labeled logged data or labeled simulated data that represents different navigation scenarios that a vehicle may experience during travel.

Control system 506 may be part of computing device 502 or another system that can control systems of the vehicle. For instance, control system 506 may enable the vehicle to perform pass maneuvers based on disclosed techniques. Computing device 502 may factor additional information when route planning. A planned route may be based on road conditions, weather data, road grade, road banking, surface friction, objects and vehicles in the environment, and so forth. A navigation strategy may be based on vehicle conditions, such as worn tires, older brakes, front wheel or four wheel drive, a number of axles, and so forth. The navigation strategy may also be based on one or more operational choices for parameters to navigate the planned route. The navigation plan may also involve dynamically adjusting navigation during operation of the vehicle.

Figure 6:
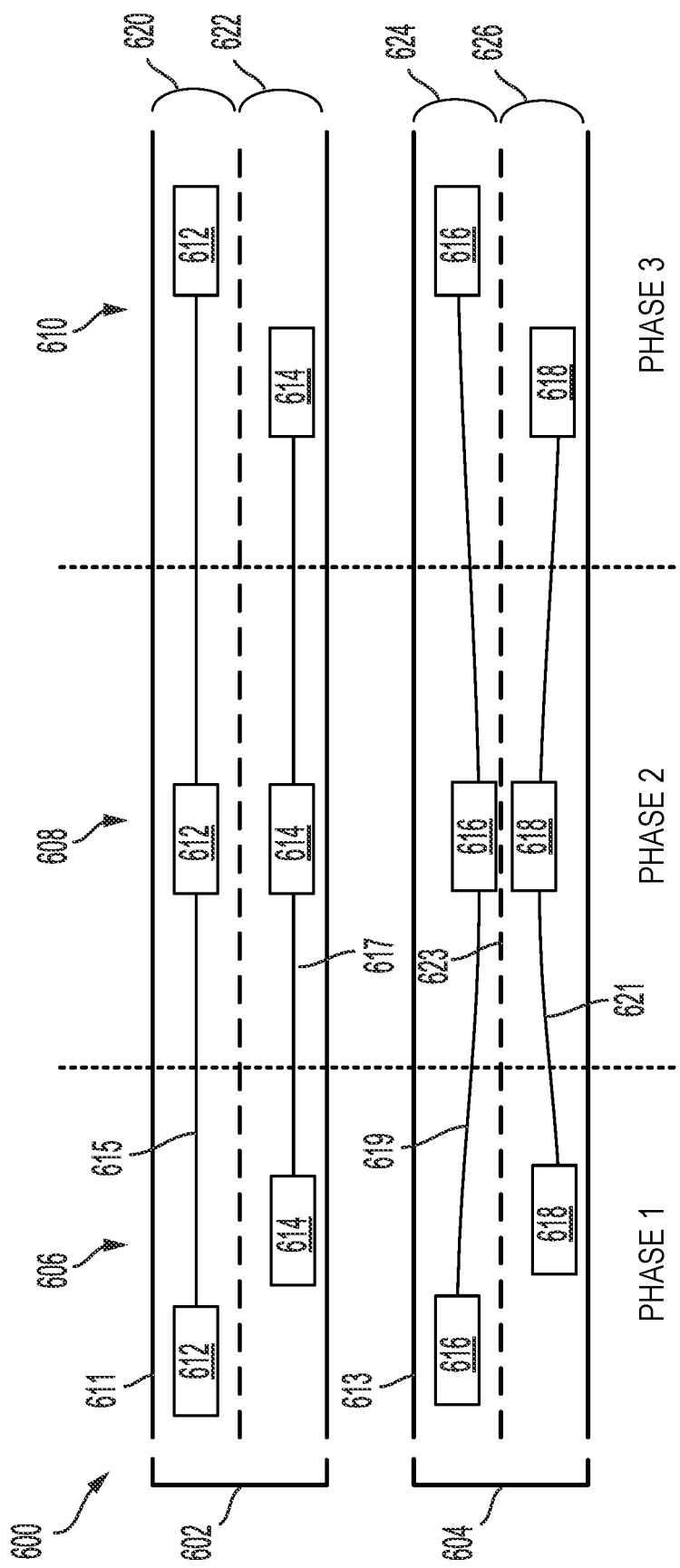
FIG. 6 is a diagram illustrating vehicle pass maneuver scenarios, according to one or more example embodiments.

FIG. 6 illustrates vehicle pass maneuver scenarios, according to one or more example embodiments. Diagram 600 shown in FIG. 6 represent pass maneuvers between vehicles and include scenario 602 where neither vehicle experiences lateral drift and scenario 604 where one of the vehicles experiences a lateral drift. As such, scenarios 602, 604 are shown as simplified illustrations to convey potential outcomes that can arise when an autonomous vehicle encounters another vehicle traveling in the same direction on a multiple lane road, such as a highway or another type of roadway.

Diagram 600 shows scenarios 602, 604 divided up into three phases in the example embodiment illustrated in FIG. 6. Phase 1 of each scenario is represented in column 606 and shows two vehicles in an arrangement prior to the performance of a pass maneuver between the vehicles. Phase 2 of each scenario is represented in the middle column (i.e., column 608) and shows the vehicles during the performance of the pass maneuver in an arrangement where the lateral distance is approximately smallest between the vehicles. In such a position, the vehicles are aligned with one of the vehicles passing the other vehicle as illustrated in column 608. The final phase (i.e., phase 3) of each scenario is represented in column 610 and shows the vehicles in an arrangement after the performance of the pass maneuver. At this point, the vehicle with the greater speed has completed the pass of the other vehicle.

Scenario 602 represents a situation where neither vehicle experiences unintentional lateral movement during the performance of a pass maneuver. As shown in scenario 602, vehicle 612 is traveling in lane 620 on road 611 and vehicle 614 is traveling in lane 622 on road 611. In the example, vehicle 612 is traveling faster than vehicle 614 as both vehicles 612, 614 navigate in the same direction on road 611.

During phase 1 of scenario 602 represented in column 606, vehicle 614 is in a lead position relative to vehicle 612 as both vehicles 612, 614 travel from left to right on road 611. For instance, vehicle 612 may be traveling behind vehicle 614 and perform a lane change from lane 622 into lane 620 in order to pass vehicle 614 as shown in scenario 602. In other examples, vehicle 612 may already be traveling in lane 620 at a faster rate than vehicle 614 traveling in lane 622 of road 611.

During phase 2 of scenario 602 shown in column 608, vehicle 612 and vehicle 614 are shown in an aligned arrangement with neither vehicle leading the other. In particular, the faster speed of vehicle 612 has enabled it to catch up to a position parallel to vehicle 614 during scenario 602 as shown in column 608. The arrangement of vehicles 612, 614 during phase 2 is temporary until a speed difference between vehicles 612, 614 causes one of the vehicles to start leading the other. During phase 2, one or both vehicles 612, 614 may experience unintentional drift in some cases. In scenario 602, however, neither vehicle 612, 614 is shown experiencing an unintentional drift towards each other. Rather, vehicle 612 is shown traveling straight path 615 without any deviation due to an unintentional drift and vehicle 614 is shown traveling straight path 617 without experiencing a drift. As such, phase 3 of scenario 602 shown in third column 610 shows vehicle 612 in a lead position relative to vehicle 614.

In scenario 602, one or both vehicles 612, 614 may estimate a potential drift that may occur during phase 2 as vehicle 612 passes vehicle 614. In the example, however, vehicle 612 and/or vehicle 614 may determine that the amount of drift may be below a threshold level of drift due to the parameters specific to scenario 602. As an example result, each vehicle 612, 614 may minimally adjust behaviors. In other cases, scenario 602 can represent a situation involving one or both vehicles 612, 614 adjusting behavior to maintain straight paths 615, 617, respectively. For instance, one or both vehicles 612, 614 can perform disclosed techniques to anticipate potential drift and navigate in a way that minimizes the drift during the pass maneuver.

Scenario 604 represents a situation where a vehicle experiences unintentional lateral movement during the performance of a pass maneuver. As shown in scenario 604, vehicle 616 is traveling in lane 624 on road 613 and vehicle 618 is traveling in lane 626 on road 613. In the example, vehicle 616 is traveling faster than vehicle 618 as both vehicles 616, 618 navigate in the same direction on road 613. During phase 1 of scenario 604 represented in column 606, vehicle 618 is in a lead position relative to vehicle 616 as both vehicles 616, 618 travel from left to right on road 613. For instance, vehicle 616 may be traveling behind vehicle 618 and perform a lane change from lane 626 into lane 624 in order to pass vehicle 618 as shown in scenario 604. In other examples, vehicle 616 may already be traveling in lane 624 at a faster rate than vehicle 618 traveling in lane 626 of road 613.

During phase 2 of scenario 604 shown in column 608, vehicle 616 and vehicle 618 are shown in an aligned arrangement with neither vehicle leading the other. In particular, the faster speed of vehicle 616 has enabled it to catch up to a position parallel to vehicle 618 during scenario 604 as shown in column 608. The arrangement of vehicles 616, 618 during phase 2 is temporary until a speed difference between vehicles 616, 618 causes one of the vehicles to start leading the other. In addition, during phase 2, one or both vehicles 616, 618 may experience unintentional drift as vehicles 616, 618 perform the pass maneuver. As shown in FIG. 6, path 619 being traveled by vehicle 616 experiences a drift toward center line 623 of road 613, which represents an unintentional lateral movement in the direction of vehicle 618. This unintentional lateral movement is shown as part of path 619 traveled by vehicle 616 and increases the likelihood of a collision with vehicle 618. Vehicle 618 similarly experiences an unintentional drift toward center line 623 of road 613 as represented by path 621.

Different factors can contribute to the amount of drift experienced by vehicles 616, 618 as shown in scenario 604. For instance, the type and size parameters (e.g., height, weight) of vehicles 616, 618 can impact the amount of drift experienced by each vehicle 616, 618. Similarly, tire condition, winds, road material and condition (e.g., dry or wet road), and other parameters can influence the amount of drift experienced by each vehicle 616, 618. The amount of drift experienced by one vehicle can differ from the other vehicle due to various parameters, such as the direction from which the wind is blowing and the speed difference between vehicles 616, 618.

One or both vehicles 616, 618 may perform disclosed techniques in order to predict the drift that it may experience during the upcoming pass maneuver and adjust vehicle behavior based on the prediction. For instance, one or both vehicles 616, 618 can perform disclosed techniques to anticipate potential drift and navigate in a way that minimizes the drift during the pass maneuver in real-time.

Figure 7:
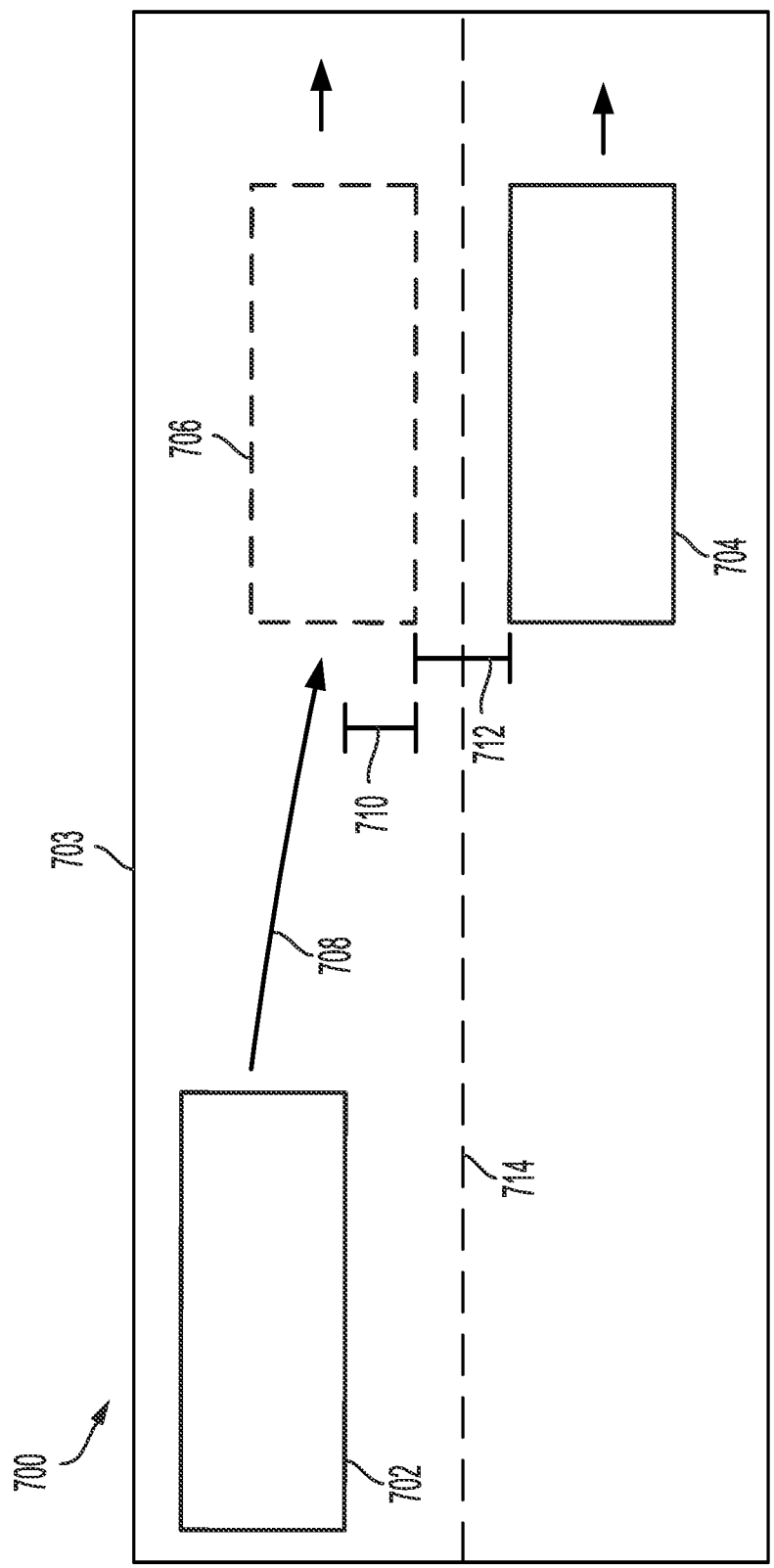
FIG. 7 illustrates a vehicle estimating an unintentional lane movement for a pass maneuver, according to one or more example embodiments.

FIG. 7 is a scenario 700 illustrating estimation of unintentional lane movement of a vehicle during a pass maneuver. In the example embodiment, scenario 700 shows vehicle 702 estimating a potential unintentional lateral movement that vehicle 702 may experience during a pass maneuver with vehicle 704.

An onboard computing system located on vehicle 702 may use sensor data to identify an upcoming pass maneuver with vehicle 704 on road 703. For instance, sensor data can be used to determine a speed difference between vehicle 702 and nearby vehicle 704 and determine that vehicle 702 is traveling faster and will pass vehicle 704 shortly. The computing system may also use sensor data to determine additional information that can be used to estimate an amount of drift that vehicle 702 may experience as a result of the pass maneuver with vehicle 704. For instance, the computing system may use a variety of parameters to estimate the drift represented by arrow 708. In some cases, the computing system may use the estimated drift to predict a future position 706 as illustrated in FIG. 7.

The computing system may estimate a lateral distance 710 associated with the expected drift represented by arrow 708. The lateral distance 710 can be compared to one or multiple predefined thresholds to determine adjustments for controlling vehicle 702. For instance, when the lateral distance 710 exceeds a threshold, the computing system may cause vehicle 702 to slow down and/or change position within its lane further from vehicle 704. In some cases, adjusting behavior can depend on maintaining a lateral buffer 712 between vehicle 702 and vehicle 704. For instance, the lateral buffer 712 can be used to prevent vehicle 702 from a potential collision with vehicle 704.

Figure 8:
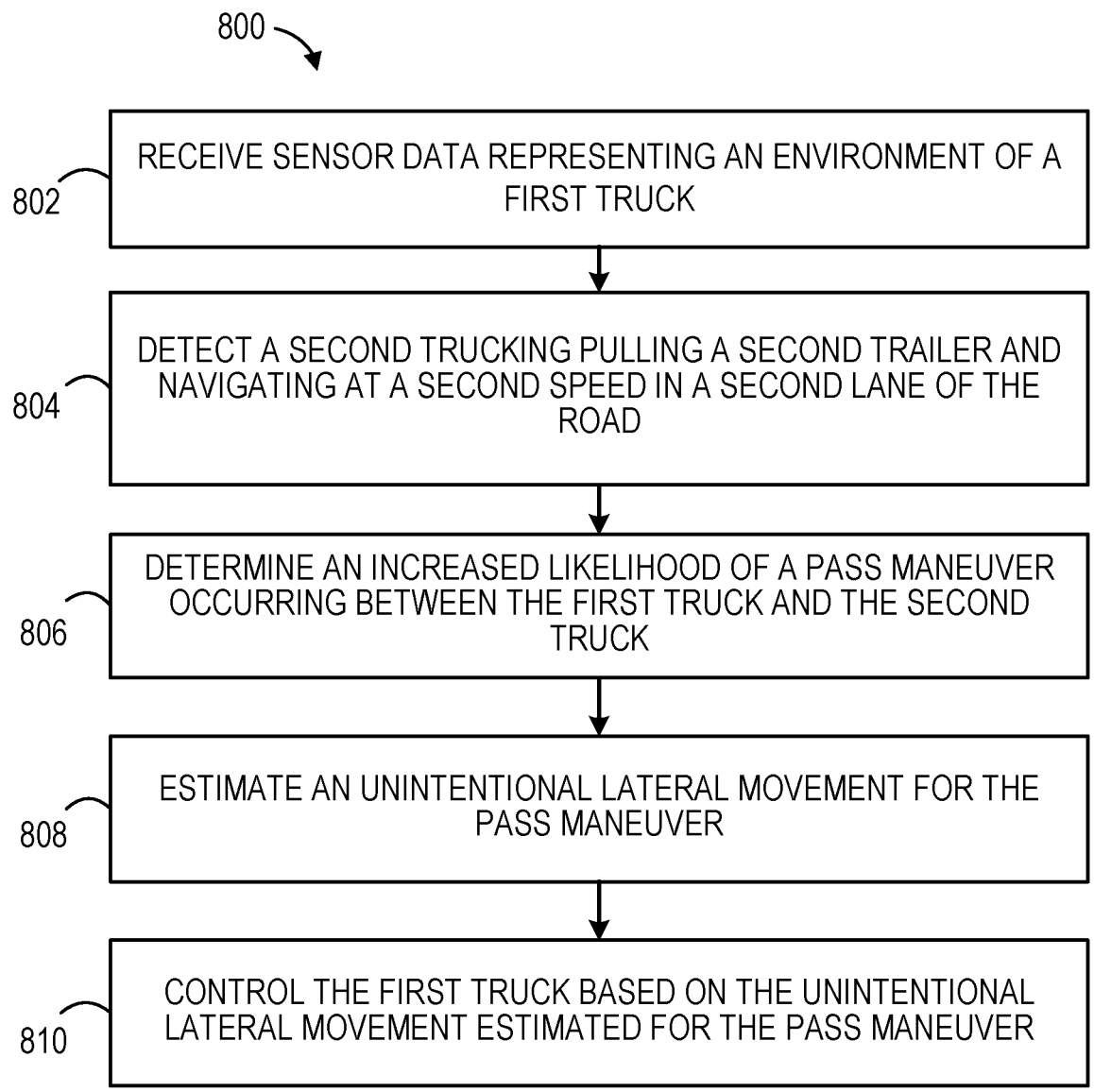
FIG. 8 is a flowchart of a method for adjusting vehicle behavior based on estimated unintentional lateral movements, according to one or more example embodiments.

FIG. 8 is a method for an example lane adjustment technique. Method 800 represents an example method that may include one or more operations, functions, or actions, as depicted by one or more of blocks 802, 804, 806, 808, and 810, each of which may be carried out by any of the systems, devices, and/or vehicles shown in FIGS. 1-7, among other possible systems. For instance, computing device 300 depicted in FIG. 3 may perform method 800.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 802, method 800 involves receiving, at a computing device coupled to a first truck pulling a first trailer, sensor data representing an environment of the first truck. The first truck is navigating at a first speed in the first lane of a road and the first speed may be above a threshold speed. For instance, the computing device may receive sensor data from a first type of sensor and a second type of sensor.

At block 804, method 800 involves detecting a second truck pulling a second trailer and navigating at a second speed in a second lane of the road based on the sensor data. The second lane is adjacent to the first lane.

At block 806, method 800 involves determining an increased likelihood of a pass maneuver occurring between the first truck and the second truck based on a difference between the first speed of the first truck and the second speed of the second truck.

At block 808, method 800 involves estimating an unintentional lateral movement for the pass maneuver. For instance, the computing device may estimate the unintentional lateral movement responsive to determining the increased likelihood of the pass maneuver occurring between the first truck and the second truck.

One or multiple parameters can be used to estimate the unintentional lateral movement that is likely to occur during the performance of the pass maneuver. For example, the computing device may estimate the unintentional lateral movement for the pass maneuver based on a plurality of parameters that includes the first speed of the first truck, the size of the second trailer being pulled by the second truck, and at least one environment parameter. Other example parameters may represent information about the second truck, such as the type and behavior of the second truck.

In some examples, the computing device may determine a position of the second truck within the second lane of the road and then estimate the unintentional lateral movement for the pass maneuver further based on the position of the second truck within the second lane of the road. In addition, the computing device may obtain sensor data measuring an oscillation of the second trailer being pulled by the second truck prior to the pass maneuver between the first truck and the second truck. The computing device may then estimate the unintentional lateral movement for the pass maneuver further based on the sensor data measuring the oscillation of the second trailer.

In some examples, the computing device may determine a road condition of the road based on sensor data and estimate the unintentional lateral movement for the pass maneuver further based on the road condition of the road.

In addition, the computing device may estimate the unintentional lateral movement for the pass maneuver further based on an intensity of cross winds propagating in the environment of the first truck. For instance, the computing device may use onboard sensors to calculate cross wind intensity. In other cases, the computing device may obtain information about the cross winds and other environmental parameters from another computing system, such as a database located remotely from the first truck. The computing device may then estimate the unintentional lateral movement for the pass maneuver further based on the intensity of cross winds propagating in the environment. In some cases, the computing device may factor the direction of the cross winds.

In some examples, the computing device may detect movements of infrastructure or foliage in the environment based on the sensor data representing the environment of the first truck. The computing device can then estimate the unintentional lateral movement for the pass maneuver further based on the estimated direction and estimated intensity of wind propagating in the environment. In addition, the computing device may also use the sensor data to detect when a wall barrier is positioned along the side of the road. The computing device may then estimate the unintentional lateral movement for the pass maneuver further based on detecting the wall barrier positioned along the side of the road.

In some examples, the computing device may use sensor data to monitor the behavior of the second truck for a threshold duration prior to the pass maneuver. The computing device may then estimate the unintentional lateral movement for the pass maneuver further based on the behavior of the second behavior for the threshold duration.

In some examples, the computing device may detect a third truck navigating on the road. The third truck can be pulling a trailer. As such, the computing device may monitor a behavior of the third truck during a pass maneuver between the third truck and the second truck and then estimate the unintentional lateral movement for the pass maneuver between the first truck and the second truck further based on the behavior of the third vehicle during the pass maneuver between the third truck and the second truck. In some instances, the computing device ebay estimate a lateral movement of the third truck during performance of the pass maneuver with the second truck and then estimate the unintentional lateral movement for the upcoming pass maneuver between the first truck and the second truck based on the estimated lateral movement of the third truck during performance of the pass maneuver with the second truck.

At block 810, method 800 involves controlling the first truck based on the unintentional lateral movement estimated for the pass maneuver. For instance, the computing device may adjust subsequent control strategy based on the unintentional lateral movement estimated for the pass maneuver. In some examples, the computing device may adjust at least the speed or the steering of the first truck (e.g., both the speed and steering) such that the first truck maintains at least a threshold gap relative to the second truck during the pass maneuver. The computing device may cause the first truck to move a lateral distance within the first lane of the road. In some cases, the computing device may cause the first truck to perform a lane change or pull over.

In some examples, the computing device may further perform a comparison between the estimated unintentional lateral movement for the pass maneuver and a threshold lateral movement. The computing device may then determine that the estimated intentional lateral movement is greater than the threshold lateral movement based on the comparison. The computing device may then cause the first truck to change lanes away from the second truck.

Figure 9:
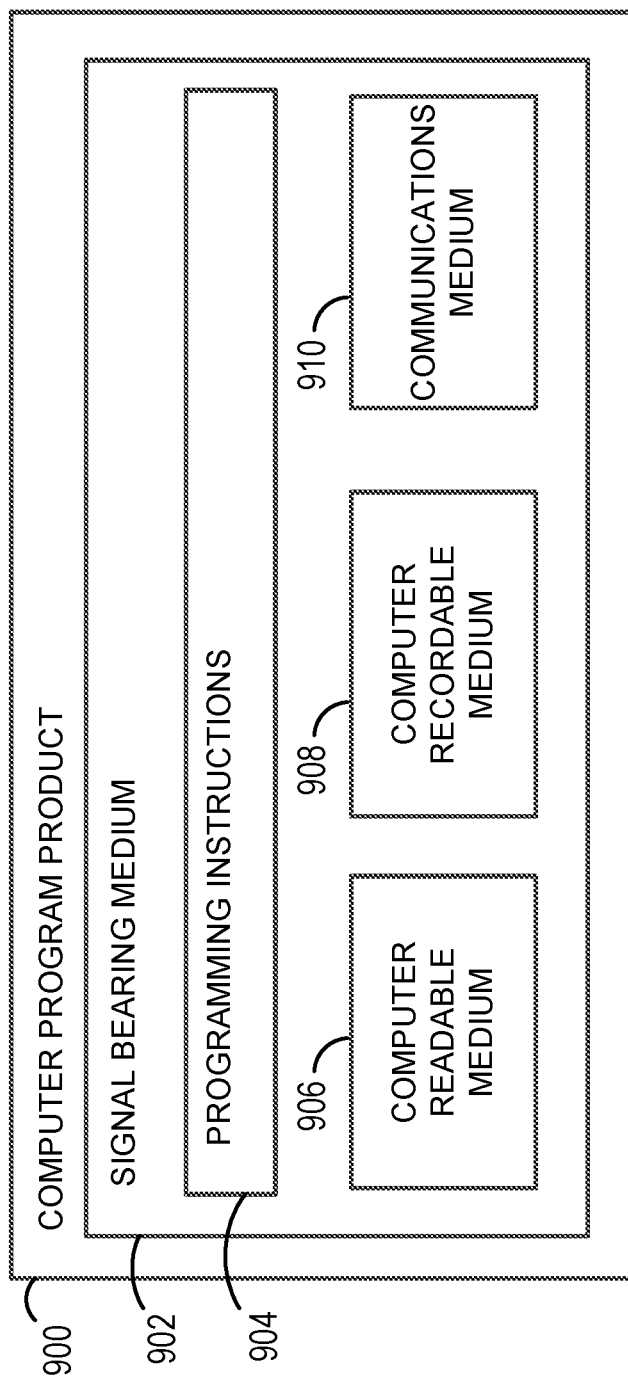
FIG. 9 is a schematic diagram of a computer program, according to one or more example embodiments.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 900 may be provided using signal bearing medium 902, which may include one or more programming instructions 904 that, when executed by one or more processors may provide functionality or portions of the functionality described above with respect to FIGS. 1-8. In some examples, the signal bearing medium 902 may encompass non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, RAY DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 may be configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a vehicle, such as vehicle 200 illustrated in FIG. 2A-2D, among other possibilities. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device coupled to a first truck pulling a first trailer, sensor data representing an environment of the first truck, wherein the first truck is navigating at a first speed in a first lane of a road, and wherein the first speed is above a threshold speed;
   based on the sensor data, detecting a second truck pulling a second trailer and navigating at a second speed in a second lane of the road, wherein the second lane is adjacent to the first lane;
   determining an increased likelihood of a pass maneuver occurring between the first truck and the second truck based on a difference between the first speed of the first truck and the second speed of the second truck;
   determining, by the computing device and using the sensor data, a plurality of parameters, wherein the plurality of parameters includes the first speed of the first truck, an estimated size of the second trailer being pulled by the second truck, and a wind condition of the environment;
   responsive to determining the increased likelihood of the pass maneuver occurring between the first truck and the second truck, estimating an unintentional lateral movement for the pass maneuver based on the plurality of parameters; and
   controlling the first truck based on the unintentional lateral movement estimated for the pass maneuver.

2. The method of claim 1, further comprising:
   based on the sensor data, determining a road condition of the road; and
   wherein estimating the unintentional lateral movement for the pass maneuver comprises:
   estimating the unintentional lateral movement for the pass maneuver further based on the road condition of the road.

3. The method of claim 1, wherein estimating the unintentional lateral movement for the pass maneuver comprises:
   estimating the unintentional lateral movement for the pass maneuver further based on an intensity of cross winds propagating in the environment of the first truck.

4. The method of claim 1, further comprising:
   monitoring a behavior of the second truck for a threshold duration prior to the pass maneuver; and
   wherein estimating the unintentional lateral movement for the pass maneuver comprises:
   estimating the unintentional lateral movement for the pass maneuver further based on the behavior of the second vehicle for the threshold duration.

5. The method of claim 1, further comprising:
   detecting a third truck navigating on the road, wherein the third truck is pulling a trailer;
   monitoring a behavior of the third truck during a pass maneuver between the third truck and the second truck; and wherein estimating the unintentional lateral movement for the pass maneuver comprises:
estimating the unintentional lateral movement for the pass maneuver further based on the behavior of the third vehicle during the pass maneuver between the third truck and the second truck.

6. The method of claim 5, wherein monitoring the behavior of the third truck during the pass maneuver comprises:
estimating a lateral movement of the third truck during performance of the pass maneuver with the second truck; and
wherein estimating the unintentional lateral movement for the pass maneuver comprises:
estimating the unintentional lateral movement for the pass maneuver based on the estimated lateral movement of the third truck during performance of the pass maneuver with the second truck.

7. The method of claim 1, wherein controlling the first truck based on the unintentional lateral movement estimated for the pass maneuver comprises:
adjusting a control strategy for the first truck such that the first truck maintains at least a threshold gap relative to the second truck during the pass maneuver.

8. The method of claim 1, further comprising:
determining a position of the second truck within the second lane of the road; and
wherein estimating the unintentional lateral movement for the pass maneuver comprises:
estimating the unintentional lateral movement for the pass maneuver further based on the position of the second truck within the second lane of the road.

9. The method of claim 1, further comprising:
obtaining sensor data measuring an oscillation of the second trailer being pulled by the second truck prior to the pass maneuver between the first truck and the second truck; and
wherein estimating the unintentional lateral movement for the pass maneuver comprises:
estimating the unintentional lateral movement for the pass maneuver further based on the sensor data measuring the oscillation of the second trailer.

10. The method of claim 1, further comprising:
based on the sensor data representing the environment of the first truck, detecting movements of infrastructure or foliage in the environment;
estimating a direction and an intensity of wind propagating in the environment based on the detected movements of infrastructure or foliage in the environment; and
wherein estimating the unintentional lateral movement for the pass maneuver comprises:
estimating the unintentional lateral movement for the pass maneuver further based on the estimated direction and estimated intensity of wind propagating in the environment.

11. The method of claim 1, further comprising:
performing a comparison between the estimated unintentional lateral movement for the pass maneuver and a threshold lateral movement; and
based on the comparison, determining that the estimated intentional lateral movement is greater than the threshold lateral movement.

12. The method of claim 11, wherein controlling the first truck based comprises:
causing the first truck to change lanes away from the second truck.

13. The method of claim 1, further comprising:
based on the sensor data, detecting a wall barrier positioned along a side of the road; and
wherein estimating the unintentional lateral movement for the pass maneuver comprises:
estimating the unintentional lateral movement for the pass maneuver further based on detecting the wall barrier positioned along the side of the road.

14. The method of claim 1, wherein receiving sensor data representing the environment of the first truck comprises:
receiving sensor data from a first type of sensor and a second type of sensor.

15. A system comprising:
a first truck pulling a trailer;
a computing device coupled to the first truck and configured to:
receive sensor data representing an environment of the first truck, wherein the first truck is navigating at a first speed in a first lane of a road, and wherein the first speed is above a threshold speed;
based on the sensor data, detect a second truck pulling a second trailer and navigating at a second speed in a second lane of the road, wherein the second lane is adjacent to the first lane;
determine an increased likelihood of a pass maneuver occurring between the first truck and the second truck based on a difference between the first speed of the first truck and the second speed of the second truck;
determine, using the sensor data, a plurality of parameters, wherein the plurality of parameters includes the first speed of the first truck, an estimated size of the second trailer being pulled by the second truck, and a wind condition of the environment;
responsive to determining the increased likelihood of the pass maneuver occurring between the first truck and the second truck, estimate an unintentional lateral movement for the pass maneuver based on the plurality of parameters; and
control the first truck based on the unintentional lateral movement estimated for the pass maneuver.

16. The system of claim 15, wherein the plurality of parameters further comprises one or more of a road condition, a road boundary, or a temperature of the environment.

17. The system of claim 15, wherein the computing device is further configured to:
estimate the unintentional lateral movement for the pass maneuver further based on a model, wherein the model depends on a plurality of prior pass maneuvers performed by the first truck.

18. The system of claim 15, wherein the computing device is further configured to:
determine an intensity of cross winds propagating in an environment of the first truck; and
estimate the unintentional lateral movement for the pass maneuver further based on the intensity of cross winds propagating in the environment of the first vehicle.

19. The system of claim 15, wherein the computing device is further configured to:
perform a comparison between the estimated unintentional lateral movement for the pass maneuver and a threshold lateral movement;
based on the comparison, determine that the estimated intentional lateral movement is greater than the threshold lateral movement; and
cause the first truck to change a position with the first lane prior to the pass maneuver.

20. A non-transitory computer readable medium configured to store instructions, that when executed by a computing device, causes the computing device to perform operations comprising:
- receiving sensor data representing an environment of a first truck pulling a first trailer, wherein the first truck is navigating at a first speed in a first lane of a road, and wherein the first speed is above a threshold speed;
- based on the sensor data, detecting a second truck pulling a second trailer and navigating at a second speed in a second lane of the road, wherein the second lane is adjacent to the first lane;
- determining an increased likelihood of a pass maneuver occurring between the first truck and the second truck based on a difference between the first speed of the first truck and the second speed of the second truck;
- determining, using the sensor data, a plurality of parameters, wherein the plurality of parameters includes the first speed of the first truck, an estimated size of the second trailer being pulled by the second truck, and a wind condition of the environment;
- responsive to determining the increased likelihood of the pass maneuver occurring between the first truck and the second truck, estimating an unintentional lateral movement for the pass maneuver based on the plurality of parameters; and
- controlling the first truck based on the unintentional lateral movement estimated for the pass maneuver.

* * * * *